United States Patent [19]

Keelan et al.

[11] Patent Number: 5,537,166
[45] Date of Patent: Jul. 16, 1996

[54] EXTERNAL PROJECTION LENS APERTURE

[75] Inventors: Brian W. Keelan, Rochester; Daniel M. Pagano, Honeoye Falls, both of N.Y.

[73] Assignee: Eastman Kodak Company, Rochester, N.Y.

[21] Appl. No.: 448,241

[22] Filed: May 23, 1995

[51] Int. Cl.⁶ .............................. G03B 21/14; G02B 9/00
[52] U.S. Cl. ................................ 353/97; 359/739
[58] Field of Search ........................ 353/100, 97, 101; 359/815, 818, 739, 819

[56] References Cited

U.S. PATENT DOCUMENTS

| | | |
|---|---|---|
| 2,322,034 | 6/1943 | Lee ................................ 359/739 |
| 2,510,374 | 6/1950 | Brady . |
| 3,198,065 | 8/1965 | Bohm ............................. 353/97 |
| 3,213,750 | 10/1965 | Eggert ............................ 353/97 |
| 3,448,673 | 6/1969 | Singer ............................ 353/97 |
| 4,078,861 | 3/1978 | Böhme ........................... 353/97 |
| 4,666,277 | 5/1987 | Tanaka ........................... 359/739 |
| 4,778,252 | 10/1988 | Filho ............................. 350/252 |

FOREIGN PATENT DOCUMENTS 1061040  11/1953  France .

*Primary Examiner*—William C. Dawling
*Attorney, Agent, or Firm*—Thomas H. Close

[57] ABSTRACT

An external projection lens aperture, including a holder; an adjustable aperture mounted in the holder; and a self-centering clamping mechanism mounted in the holder for attaching the holder to an end of a projection lens barrel.

4 Claims, 3 Drawing Sheets

EXTERNAL PROJECTION LENS APERTURE

FIELD OF THE INVENTION

The invention relates generally to the field of image projection, and in particular to the use of an external aperture on the lens of a slide projector.

BACKGROUND OF THE INVENTION

Slide projection lenses are designed to be well-suited for a variety of applications. They are usually fast lenses (large aperture, small f-number) to maximize image brightness on the screen. This is advantageous in situations where ambient light cannot be completely eliminated. However, larger apertures have two disadvantages compared to smaller ones: (1) less depth of field; and, (2) reduced Modulation Transfer Function (MTF) due to increased aberrations. Less depth of field causes center to edge sharpness fall-off with open-mounted slides, and requires more accurate and more frequent focusing (whether manual focus or autofocus). Reduced MTF is manifested as poorer sharpness over the entire projected image.

Incorporation of an iris diaphragm into a projection lens design allows optimal aperture choice.

When the surroundings are completely dark, the lens can be stopped down (smaller aperture) and improved sharpness, better center to edge sharpness uniformity, and more lenient focus tolerances can be achieved. If there is stray ambient light, however, the lens can be completely opened up, so that the image brightness overpowers the veiling flare due to ambient illumination, and thereby avoids excessive contrast loss.

However, virtually no presently marketed projection lenses incorporate iris diaphragms due to cost considerations. This means that projectionists do not have the control over the lens characteristics necessary to obtain the best possible results in a variety of circumstances.

SUMMARY OF THE INVENTION

The present invention is directed to overcoming one or more of the problems set forth above. Briefly summarized, according to one aspect of the present invention, an external projection lens aperture includes a holder; an adjustable aperture mounted in the holder; and a self-centering clamping mechanism mounted in the holder for attaching the holder to an end of a projection lens barrel.

The present invention makes use of the remarkable fact that external apertures, attached to projection lenses, can yield benefits similar to those of internal apertures. Conventional optical design practices avoid the use of an external aperture on an image forming lens due to the potential for vignetting, but we have found that a very favorable tradeoff can be made between vignetting and an improvement in MTF and depth of field.

A single external aperture according to the present invention can be attached to any of a number of ordinary projection lenses, both of current and past designs. This permits a projectionist to obtain superior image quality and convenience, without rendering existing equipment obsolete.

The advantages associated with this invention are improved overall image sharpness, better center to edge sharpness uniformity, and relaxed focus tolerances in slide projection under a variety of conditions.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The effects of lens aperture on depth of field and lens MTF are well known. Depth of field (at the slide position), which is directly related to focus tolerances, is proportional to the lens f-number. Nearly all lenses, as they are stopped down, initially improve in MTF due to a reduction in aberrations. Eventually, an increase in diffraction counteracts the improvement in aberrations, leading to a decrease in MTF. The optimum MTF usually occurs two to three stops down from wide open, which typically is in the range of f/5.6 to f/11.

There is very little known about the effect of external apertures, which produce what may be regarded as controlled vignetting of the image.

Visual experiments performed by the present inventors showed that as a representative projection lens was stopped down with an external aperture, the image became sharper overall, and in particular, the edges of the image became much sharper (especially with glassless slides). Eventually, when the aperture was about half the diameter of the front lens element, the sharpness at the center of the image stabilized. Stopping down beyond this point continued to improve the edge sharpness, but eventually undesirable image illumination non-uniformity (vignetting) became apparent.

MTF measurements confirmed that a substantial improvement in lens response occurred when an external aperture that was about half the diameter of the front lens element was attached. For example, the area-weighted response at 20 line pairs (cycles) per mm increased from 64% without an aperture to 77% with an external aperture.

Ideally, then, a projectionist would like to have an iris diaphragm that could be attached to a variety of lenses, and that would allow optimization of the aperture diameter over a range of viewing conditions. Typically, the projectionist would project a representative slide, and stop down the aperture until flare from stray ambient light became detectable or until the optimum position was reached (best compromise of sharpness and image illumination uniformity). In the former case (stray light-limited), the aperture would be opened up slightly to allow margin for error due to underexposed slides.

Figure 1:
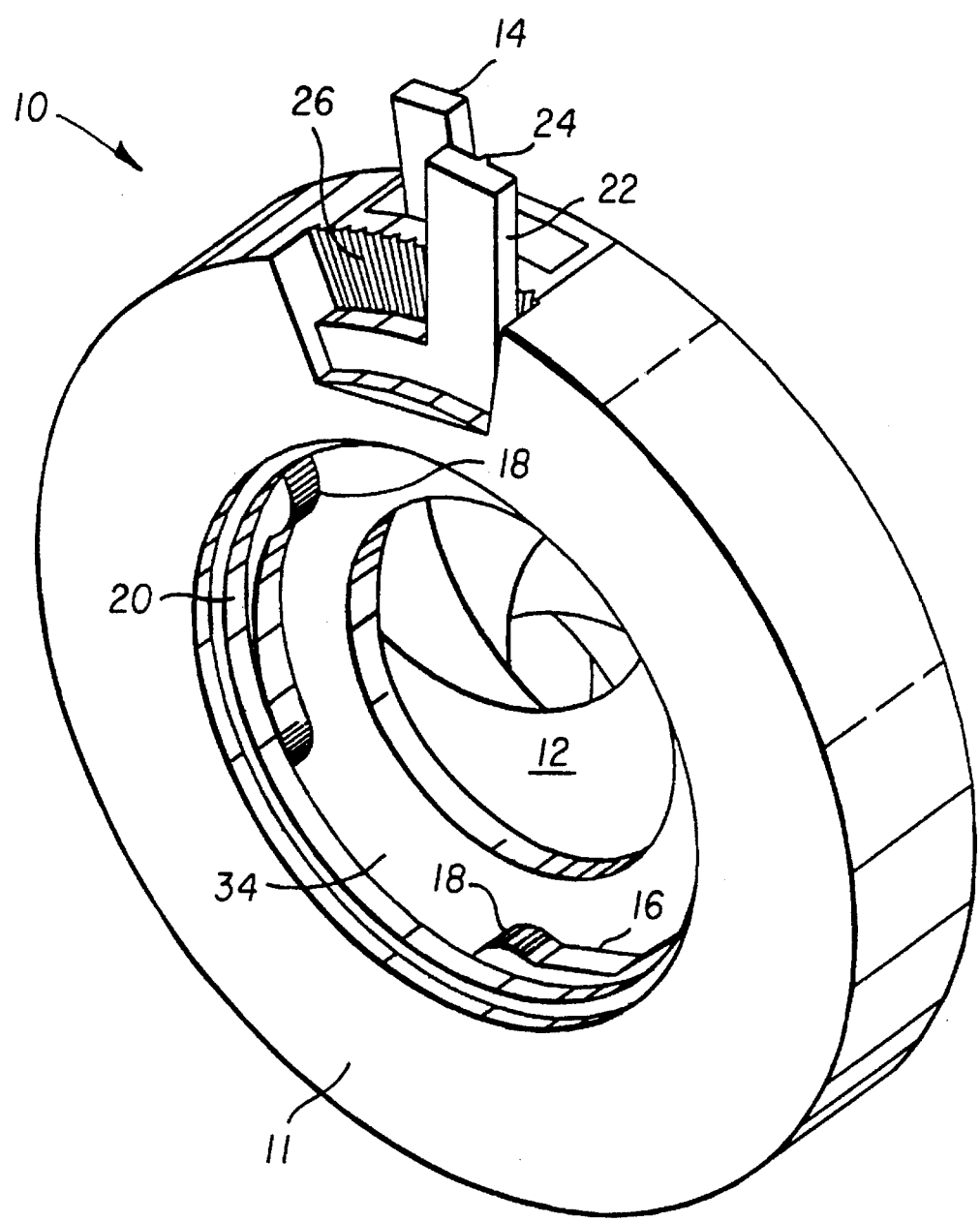
FIG. 1 is an isometric view of the external projection lens aperture according to the present invention.

Referring to FIG. 1, an external projection lens aperture, generally designated 10, according to the present invention includes a holder 11 that carries an adjustable aperture such as an iris mechanism 12 that is operated (opened and closed) by lever 14. This type of iris mechanism is well-known in the art; as lever 14 is rotated in one direction, the aperture is opened. Rotation in the opposite direction closes the aperture. A self-centering clamping mechanism is also mounted in the holder 11. The self-centering clamping mechanism includes three pivotally mounted locking arms 16, having barrel clamping surfaces 18. The locking arms 16 are simultaneously pivoted by an actuating ring 20 (shown more clearly in FIGS. 2a and 2b), having a lever 22 for rotating the actuating ring 20.

The iris mechanism 12 can be used with a multitude of projector lenses, due to the adjustable clamping mechanism. The clamping mechanism allows for a range of lens diameters and is self-centering.

To help insure that the iris assembly is securely mounted on the projection lens, clamping surfaces 18 of locking arms 16 have a knurled surface or, alternatively, may be rubber-coated. Ring 20 is held in the locked position by a rib 24 on the back side of lever 22 (part of ring 20) and grooves 26 in holder 11.

Figure 3:
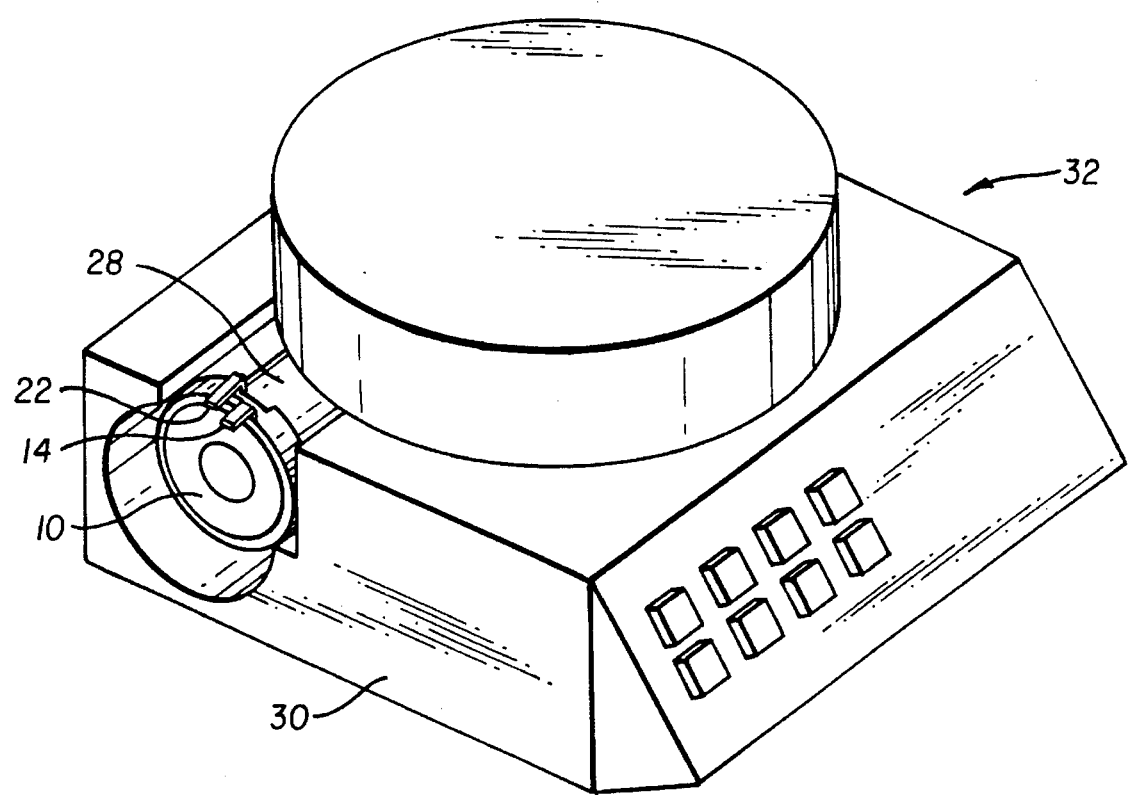
FIG. 3 is an isometric view of a slide projector with an external projection lens aperture according to the present invention.

As shown in FIG. 3, the external projection lens aperture 10 is placed over a projection lens barrel 28 mounted in the housing 30 of a slide projector 32. When mounted on the lens barrel 28, an internal surface 34 of the holder 11 (see FIG. 1) is pressed against the front surface of the projection lens barrel 28.

Figure 2A:
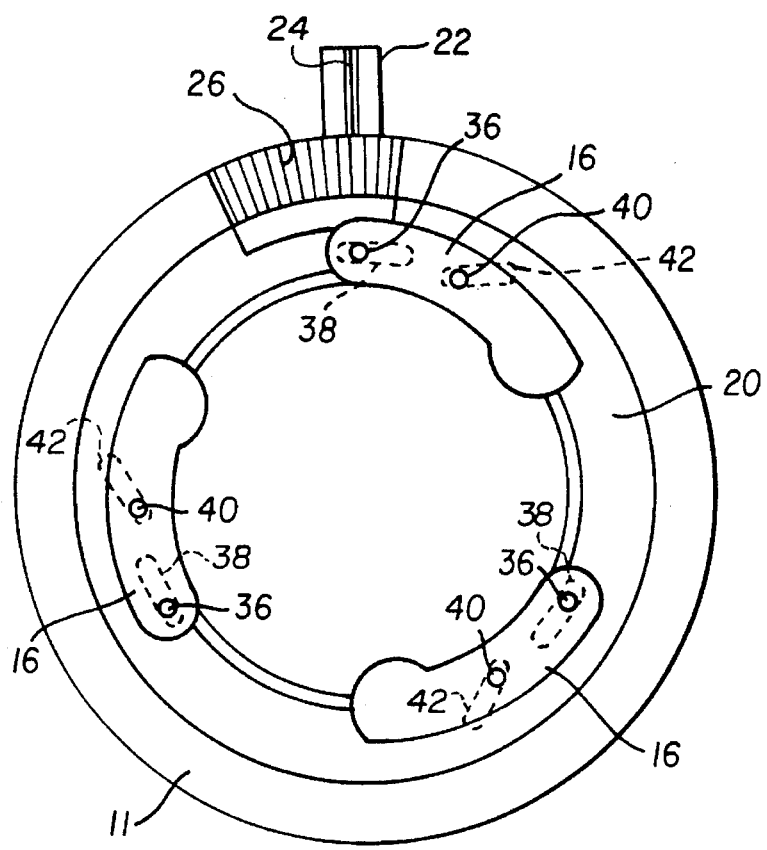
FIGS. 2a and 2b are schematic views showing two positions of the clamping mechanism.
Figure 2B:
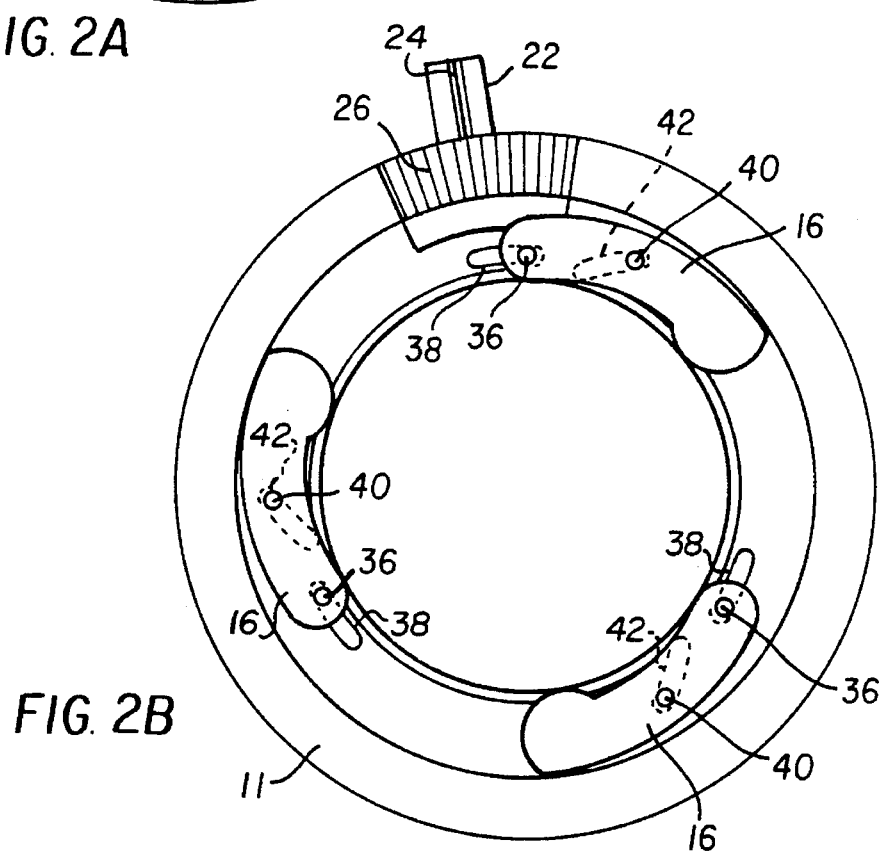

Referring now to FIGS. 2a and 2b, each locking arm 16 is mounted for pivotal movement in the holder 11 by pins 36. Pins 36 pass through circumferential slots 38 in ring 20 allowing rotation of ring 20. Each locking arm 16 is provided with a pin 40 that rides in an oblique slot 42 of ring 20. When lever 22 is rotated fully clockwise as shown in FIG. 2a., the locking arms 16 are caused to pivot clockwise about pins 36 due to a camming action of oblique slots 42 in ring 20 and pins 40 carried by locking arms 16. The symmetrical rotation of the locking arms 16 centers the external projection lens aperture 10 on the projection lens barrel 28. FIG. 2a shows the clamping mechanism in the fully clamped position, and FIG. 2b shows it in the unclamped position. To release the external projection lens aperture 10 from the projection lens barrel 28, lever 22 is pushed away from the grooves 26 and rotated counterclockwise as shown in FIG. 2b.

In the event that a projection lens barrel does not protrude out of the projector housing, levers 14 and 22 may be angled to project forward along the axis of the lens barrel 28 as shown in FIG. 3.

The invention has been described with reference to a preferred embodiment. However, it will be appreciated that variations and modifications can be effected by a person of ordinary skill in the art without departing from the scope of the invention.

PARTS LIST 10 external projection lens aperture
11 holder
12 iris mechanism
14 lever
16 locking arms
18 barrel clamping surfaces
20 actuating ring
22 lever
24 rib
26 grooves
28 projection lens barrel
30 housing
32 slide projector
34 internal surface
36 pins
38 circumferential slots
40 pin
42 oblique slot

We claim:

1. A slide projector, comprising:

a) a projector housing;

b) a projection lens having a lens barrel mounted in the projector housing;

c) an external projection lens aperture mounted on the end of the projection lens barrel, the projection lens aperture including a holder; an adjustable aperture mounted in the holder; and a self-centering clamping mechanism mounted in the holder for attaching the holder to the end of the projection lens barrel, the self-centering clamping mechanism including three pivotally mounted locking arms having lens barrel clamping surfaces, and an actuating ring for simultaneously pivoting the locking arms such that the lens barrel clamping surfaces are symmetrically moved into clamping engagement with the lens barrel.

2. The slide projector claimed in claim 1, wherein the adjustable aperture is an iris diaphragm.

3. An external projection lens aperture, comprising:

a) a holder;

b) an adjustable aperture mounted in the holder; and c) a self-centering clamping mechanism mounted in the holder for attaching the holder to an end of a projection lens barrel, the self-centering clamping mechanism including three pivotally mounted locking arms having lens barrel clamping surfaces, and an actuating ring for simultaneously pivoting the locking anus such that the lens barrel clamping surfaces are symmetrically moved into clamping engagement with the lens barrel.

4. The external projection lens aperture claimed in claim 3, wherein the adjustable aperture is an iris diaphragm.

* * * * *